US012648072B1

(12) United States Patent
Zhang

(10) Patent No.: US 12,648,072 B1
(45) Date of Patent: Jun. 2, 2026

(54) LIGHT EMITTING DIODE (LED) LIGHTING SYSTEMS AND METHODS

(71) Applicant: Haicheng Zhang, Kennesaw, GA (US)

(72) Inventor: Haicheng Zhang, Kennesaw, GA (US)

(73) Assignee: Zhang Haicheng, Kennesaw, GA (US)

( * ) Notice: Subject to any disclaimer, the term of this patent is extended or adjusted under 35 U.S.C. 154(b) by 147 days.

(21) Appl. No.: 18/611,508

(22) Filed: Mar. 20, 2024

(51) Int. Cl.

| | |
|---|---|
| ***H05B 47/175*** | (2020.01) |
| ***H05B 45/10*** | (2020.01) |
| ***H05B 45/20*** | (2020.01) |
| ***H05B 47/195*** | (2020.01) |

(52) U.S. Cl.
CPC ......... *H05B 47/1965* (2024.01); *H05B 45/10* (2020.01); *H05B 45/20* (2020.01); *H05B 47/195* (2020.01); *H05B 47/1985* (2024.01)

(58) Field of Classification Search
CPC .... H05B 47/1965; H05B 45/10; H05B 45/20; H05B 47/195; H05B 47/1985
See application file for complete search history.

(56) References Cited

U.S. PATENT DOCUMENTS

| | | | | |
|---|---|---|---|---|
| 2022/0174802 A1* | 6/2022 | Cai | ........................ | A01G 7/045 |
| 2025/0142696 A1* | 5/2025 | Cheng | .................... | H05B 45/46 |

* cited by examiner

*Primary Examiner* — Minh Tran

(74) *Attorney, Agent, or Firm* — Lei Fang, Esq.; Smith Tempel Blaha LLC

(57) ABSTRACT

A hand-held, non-contact, address-setting remote control device of an LED lighting system is configured to allow a user to selectively assign addresses to LED lights of the system. The transformer assembly of the system can be programmed remotely using an application program (hereinafter an "app") installed on a mobile device (e.g., an iPhone or Android phone). During operations, the transformer assembly uses the addresses that have been assigned to the LED lights to send commands to the LED lights to cause the LED lights to perform commands associated with the assigned addresses. The addresses of the LED lights can be easily changed using the hand-held, non-contact, address-setting remote control device, and the transformer assembly can be easily reprogrammed using the app. These features greatly improve the flexibility with which the LED lighting system can be programmed and controlled, which greatly improves usability for the installer and for the customer.

18 Claims, 7 Drawing Sheets

LIGHT EMITTING DIODE (LED) LIGHTING SYSTEMS AND METHODS

FIELD

The present disclosure relates generally to light emitting diode (LED) lighting systems and methods, and more particularly, to remotely programmable and controllable LED lighting systems and methods.

BACKGROUND

LED lighting systems are used in a variety of indoor and outdoor applications for a variety of purposes. LED lighting systems are often favored over conventional lighting systems for many reasons, including efficiency, color choice options and long life spans. In outdoor applications, LED lighting systems are often used to illuminate and/or accent landscape features, building features, pathways, waterscapes, outdoor grill areas, and swimming pool areas, for example.

Each individual LED light can have one or more LEDs of the same color or of different colors. Each LED light typically includes an LED driver for driving the LED(s) of the LED light. The LED drivers are controlled by a transformer assembly of the LED lighting system that transforms an electrical power signal received from the power system of the customer premises into an AC or DC power signal that is then forwarded to the LED driver. Either in the transformer assembly or in the LED driver, the AC power signal is converted into a DC signal that the LED driver uses to power and control the LED(s).

The transformer assemblies can be programmed or configured to control the LED drivers to cause them to perform a variety of operations. For example, a transformer assembly can control the LED drivers to cause LEDs of one color to be turned on while LEDs of other colors are turned off, to cause the level of optical intensity of one or more of the LEDs to be decreased (e.g., dimming), to cause the LED light to change color in a particular sequence, to cause the LED lights in one area to display light of a particular color while LED lights in a different area display light of a different color.

A variety of system configurations exist for configuring or programming the transformer assemblies and the LED drivers to enable them to perform such operations, but they often lack flexibility regarding programmability and controllability. A need exists for LED lighting systems that have improved programmability and controllability for performing these and other types of operations.

SUMMARY

Various implementations of systems, methods and devices within the scope of the appended claims each have several aspects, no single one of which is solely responsible for the desirable attributes described herein. Without limiting the scope of the appended claims, some prominent features are described herein.

The LED lighting system comprises a transformer assembly and a plurality of LED lights. The transformer assembly comprises a network interface circuit and a processor. The network interface circuit is configured to receive LED light commands sent over a network, where each LED light command is associated with an LED light address. The processor is configured to cause the LED light commands to be combined with alternating current (AC) power signals to generate combined AC power and command signals and to transmit them over a two-wire interface of the LED lighting system. Each LED light is electrically coupled to the two-wire interface, has an assigned address and comprises one or more LEDs and an LED driver circuit. Each LED driver circuit comprises a first receiver circuit and a control circuit. The first receiver circuit is electrically coupled to the two-wire interface and is configured to receive the combined AC power and command signals transmitted over the two-wire interface and to extract the LED light commands from the combined AC power and command signals. The control circuit is configured to determine whether or not the assigned address of each respective LED light is the same as the LED light address associated with the extracted LED light command, and if so, to perform the extracted LED light command.

An embodiment of the method comprises: in a network interface circuit of a transformer assembly, receiving LED light commands sent over a network, where each LED light command being associated with an LED light address. The method further comprises: in a processor of the transformer assembly, combining the LED light commands with AC power signals to generate combined AC power and command signals and causing the combined AC power and command signals to be transmitted over a two-wire interface of the LED lighting system. The method further comprises: in first receiver circuits of respective LED lights of a plurality of LED lights of the LED lighting system that are electrically coupled to the two-wire interface, receiving the combined AC power and command signals transmitted over the two-wire interface and extracting the LED light commands from the combined AC power and command signals, each of the LED lights having an assigned address. The method further comprises: in control circuits of the respective LED lights, determining whether or not the assigned address of each respective LED light is the same as the LED light address associated with the extracted LED light commands, and if so, causing the respective LED light to perform the extracted LED light command.

In accordance with another embodiment, the LED lighting system comprises methods and circuits for transmitting and receiving LED commands and LED light address information along with alternating current (AC) power over the two-wire interface. In accordance with an embodiment, the transformer assembly comprises a first receiver circuit, a first differential signal generating circuit, an amplifier circuit, and a coupling circuit. The first receiver circuit is configured to receive a data signal sent over a network. The data signal comprises LED light commands and LED light address information. The receiver circuit is configured to convert the data signal into a pulse signal comprising a series of pulses, where each pulse is separated in time from an adjacent pulse by a first length of time, T1, or a second length of time, T2. Separations by the first and second lengths of time T1 and T2, respectively, represent bits having logic 0 and logic 1 values, respectively. The first differential signal generating circuit is configured to receive the pulse signal from the first receiver circuit and convert the pulse signal into a high-frequency differential pulse signal. The amplifier circuit is configured to receive the first high-frequency differential pulse signal from the differential signal generating circuit and to combine the high-frequency differential pulse signal with a low-frequency alternating current (AC) power signal to produce an amplified differential pulse signal comprising the combined high-frequency differential pulse signal and the low-frequency AC power signal. The coupling circuit is configured to receive the amplified differential pulse signal and to couple it onto a two-wire interface.

In accordance with an embodiment, the method for sending LED light commands and LED light address information from a transformer assembly of an LED lighting system to LED lights of the LED lighting system comprises: in a first receiver circuit of the transformer assembly, receiving a data signal sent over a network, where the data signal comprises LED light commands and LED light address information. The method further comprises: in the receiver circuit, converting the data signal into a pulse signal comprising a series of pulses, each pulse being separated in time from an adjacent pulse by a first length of time, T1, or a second length of time, T2, wherein separations by the first and second lengths of time T1 and T2, respectively, represent bits having logic 0 and logic 1 values, respectively. The method further comprises, in a first differential signal generating circuit of the transformer assembly, receiving the pulse signal from the first receiver circuit and converting the pulse signal into a first high-frequency differential pulse signal. The method further comprises: in an amplifier circuit of the transformer assembly, receiving the first high-frequency differential pulse signal from the first differential signal generating circuit and combining the first high-frequency differential pulse signal with a low-frequency AC power signal to produce an amplified differential pulse signal comprising the combined first high-frequency differential pulse signal and the low-frequency AC power signal. The method further comprises: with a coupling circuit of the transformer assembly, receiving the amplified differential pulse signal and coupling the amplified differential pulse signal onto a two-wire interface.

These and other inventive features and aspects will become apparent from the following description, drawings and claims.

BRIEF DESCRIPTION OF THE DRAWINGS

In the figures, like reference numerals refer to like parts throughout the various views unless otherwise indicated. For reference numerals with letter character designations such as "102*a*" or "102*b*", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
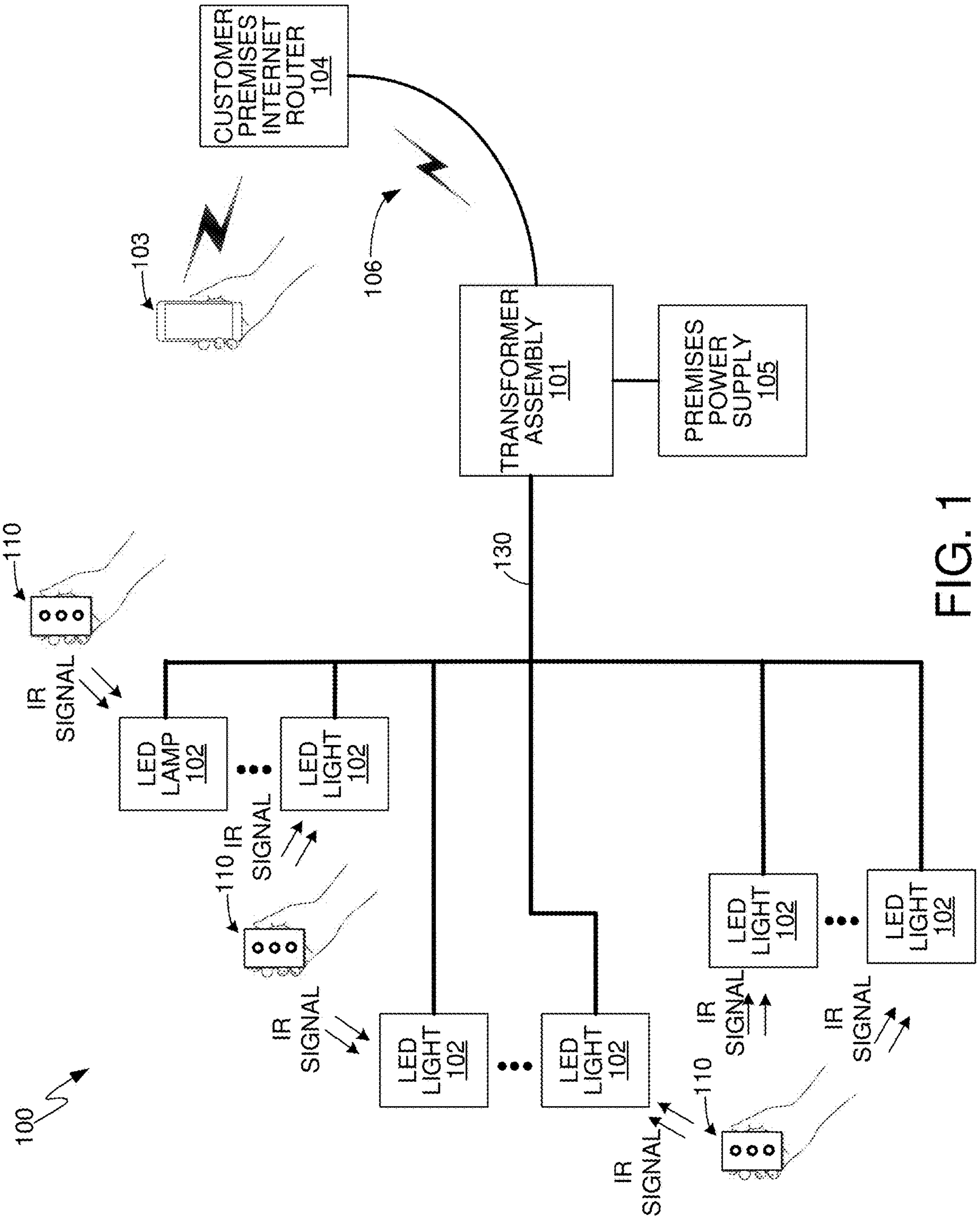
FIG. 1 shows a block diagram of an LED lighting environment in which an exemplary embodiment of the LED lighting system of the present disclosure is deployed.

The present disclosure is directed to an LED lighting system and method that provide improved flexibility in regard to programmability and controllability. A hand-held, non-contact, address-setting remote control device of the system is configured to allow a user to selectively and remotely assign addresses to LED lights of the LED lighting system. The transformer assembly of the system can be programmed remotely using an application program (hereinafter an "app") installed on a mobile device (e.g., an iPhone or Android phone). During operations, the transformer assembly uses the addresses that have been assigned to the LED lights to send commands to the LED lights to cause the LED lights to perform commands. The addresses of the LED lights can be easily changed using the hand-held, non-contact, address-setting remote control device, and the transformer assembly can be easily reprogrammed using the app. These features greatly improve the flexibility with which the LED lighting system can be programmed and controlled, which greatly improves usability for the installer and for the customer.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The words "illustrative" or "representative" may be used herein synonymously with "exemplary." Any aspect described herein as "exemplary" is not necessarily to be construed as preferred or advantageous over other aspects. However, it will be apparent to one having ordinary skill in the art and having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory device", as that term is used herein, is intended to denote a non-transitory computer-readable storage medium that is capable of storing computer instructions, or computer code, for execution by one or more processors. References herein to a "memory device" should be interpreted as including one or more memory devices.

A "processor", as that term is used herein, encompasses an electronic component that is able to execute a computer program or executable computer instructions. References herein to a computer comprising "a processor" should be interpreted as one or more processors. The processor may for instance be a multi-core processor comprising multiple processing cores, each of which may comprise multiple processing stages of a processing pipeline. A processor may also refer to a collection of processors within a single system or distributed amongst multiple systems.

The term "logic," as that term is used herein, denotes digital circuits, such as digital gate structures, that are combined and configured in a particular manner to achieve one or more particular functions. For example, control logic can be a combination of digital circuits that have been combined and configured in a particular manner to achieve one or more particular control functions, either solely in hardware or in a combination of hardware, software and/or firmware.

A "controller", as that term is used herein, encompasses an electronic component that is able to execute a computer program or executable computer instructions. References herein to a "controller" should be interpreted as one or more controllers. A "control circuit", as that term is used herein, comprises circuitry for controlling a device and can comprise a controller, but can also comprise other circuitry, such as, for example, other digital logic and/or analog circuitry that assist the control circuit in performing certain operations or functions.

FIG. 1 shows a block diagram of an LED lighting environment, such as an outdoor area of a customer premises, at which an exemplary embodiment of the LED lighting system 100 of the present disclosure is deployed. The LED lighting system 100 comprises a transformer assembly 101, a plurality of LED lights 102, a non-contact, hand-held, address-setting remote control device 110 dedicated to the system 100, and an app that can run on a hand-held mobile device 103, such as an iPhone or an Android phone.

At whichever premises the LED lighting system 100 is installed, the transformer assembly 101 preferably is connected to the Internet router 104 of the customer premises via either a wireless (e.g., WiFi) or wired connection (e.g., Ethernet connection). The wireless and/or wired connection is designated by reference numeral 106. Thus, the transformer assembly 101 has an IP address on the premises network and is accessible via the Internet. The transformer assembly 101 may have its own AC power supply, but is typically connected to, and is powered by, the AC power supply 105 of the customer premises.

The app running on the mobile device 103 can be used by a user to configure the transformer assembly 101 to control the manner in which the transformer assembly 101 controls the LED lights 102. For example, a user of the mobile device 103 can use the app to command the transformer assembly 101 to perform one or more actions, such as, for example, to cause the LED lights 102 to display particular colors, to cause the LED lights 102 to change color in a particular sequence, to cause the LED lights 102 to display different colors in different zones, to cause the LED lights 102 to dim in optical intensity, etc. The mobile device 103 communicates with the transformer assembly 101 by communicating over the Internet with the router 104, which then communicates with the transformer assembly 101 via the wired or wireless link 106.

The transformer assembly 101 uses an address assigned to each LED light 102 to send commands to the LED lights 102. Multiple LED lights 102 can be assigned the same address or all of the LED lights 102 can be assigned different addresses. One of the preferred features of the system 100 is that the dedicated non-contact, hand-held, address-setting remote control device 110 uses over-the-air (OTA) signaling to assign the addresses to the LED lights 102. The OTA signaling can be radio frequency (RF) signaling, in which case an RF transmitter (not shown) of the remote control device 110 transmits the address over the air via an RF link and an RF receiver (not shown) of the LED driver circuit (not shown) of the LED light 102 receives and decodes the RF signal to recover the address, which is then stored in a memory device of the LED driver circuit and used later by circuitry of the LED driver circuit to decode messages sent by the transformer assembly 101 to the LED driver circuit.

Alternatively, and preferably, the OTA signaling is infrared (IR) signaling, in which case an IR LED (not shown) of the remote control device 110 transmits the address over the air via an IR link and an IR detector (not shown) of the LED driver circuit (not shown) of the Led light 102 receives and decodes the IR signal to recover the address. The address is then stored in a memory device of the LED driver circuit and used later by circuitry of the LED driver circuit to decode messages sent by the transformer assembly 101 to the LED driver circuit.

For purposes of discussion, it will be assumed hereinafter that the OTA link is an IR link. The address-setting remote control device 110 typically has a range of about ten feet to allow it to assign addresses to the LED lights 102 via the IR link. However, the inventive principles and concepts are not limited in regard to the transmission range of the remote control device 110.

One of the disadvantages of some LED lighting systems that are currently available in the market is that the address-setting remote control devices used in those systems typically have to be connected to, or placed in contact with, the LED lights in order to assign the address. This can present difficulties when the LED lights are installed at hard-to-reach places, such as high above the ground or floor on a structure or in a tree, for example. In such cases, a ladder or other device may be needed to set the addresses of the LED lights. The non-contact, hand-held, address-setting remote control device 110 of the present disclosure eliminates these and other problems and makes it easier to set and reset the addresses of the LED lights 102 to facilitate programming and reprogramming of the system 100.

In accordance with an exemplary embodiment, each LED light 102 is connected to an output of the transformer assembly 101 via a two-wire connection, or interface 130. Each two-wire connection supplies a 12-volt AC power signal to the respective LED light 102. When the transformer assembly 101 communicates via the two-wire connections 130 with the LED lights 102, it transmits data on the 12-volt AC power signal that includes each light's assigned address and one or more instructions to be performed by the LED light(s) 102 that has been assigned the address. Each LED light 102 that has been assigned the address associated with the signal that is transmitted by the transformer assembly 101 performs the instructions associated with the address. LED lights 102 that have been assigned an address that is different from the address that is transmitted by the transformer assembly 101 ignore the instructions or are unable to decode them.

One of the advantages of using this two-wire interface 130 is that it is capable of simultaneously sending both electrical power and control signals from the transformer assembly 101 to the LED lights 102. Compared with wireless solutions, for example, this power and control reliability is high and is not interfered with by other wireless signals or obstacles. The two-wire connections 130 also provide the ability to operate in places where wireless signals cannot reach, such as below the ground and underwater.

As will be described below with reference to FIG. 2, each LED light 102 comprises one or more LEDs and an LED driver circuit. Each LED driver circuit comprises control circuitry that is configured to determine whether or not a communication received over the respective two-wire connection 130 includes the address that has been assigned to the respective LED light 102 by the address-setting remote control device 110. If so, the control circuitry of the LED light 102 causes the respective LED light 102 to perform the instructions, but otherwise ignores the instructions.

As one example, the address-setting remote control device 110 may be configured to assign three addresses to the plurality of LED lights 102. If the LED light emitted by the LED lights 102 is being used to augment or accent landscaping, for example, a plurality of the LED lights 102 located in a zone 1 may be assigned an address 001, a plurality of the LED lights 102 located in a zone 2 may be assigned an address 010, and a plurality of the LED lights 102 located in a zone 3 may be assigned an address 011. Each LED light 102 may contain, for example, a red LED, a green LED, a blue LED and a white LED.

In this example, it is assumed that zones 1, 2 and 3 are spatially separated from one another such that using the remote control device 110 to assign an address to LED lights 102 in one of the zones will not result in that same address 001 simultaneously being assigned to LED lights in one or more of the other zones. For example, the remote control device 110 can be used to assign address 001 to LED lights 102 without causing address 001 to simultaneously be assigned to LED lights 102 in zone 2, and vice versa. The reason for this is that the address of each LED light 102 can be set individually after installation, making it easier to debug and manage the LED lights 102. In addition, the IR signal generated by the remote control device 110 is directional. In other words, after an LED light 102 is installed, its address can be assigned by pointing the remote control device 110 directly towards the LED light 102 to set its address. Any LED lights 102 other than the LED light 102 being aimed at will not be affected by the IR signal, thereby preventing other LED lights 102 from inadvertently being assigned an incorrect address.

Using the app running on the mobile device 103, the user can then instruct the transformer assembly 101 to assign, for example, blue light to zone 1, red light to zone 2 and white light to zone 3. The transformer assembly 101 will then transmit commands (i.e., the aforementioned instructions) via the two-wire interface 130 to all of the LED lights 102 to cause all LED lights 102 that have been assigned address 001 to output blue light, all LED lights 102 that have been assigned address 010 to output red light and all LED lights 102 that have been assigned address 011 to output white light. The result will be that all LED lights 102 located in zone 1 will output blue light, all LED lights 102 located in zone 2 will output red light and all LED lights 102 in zone 3 will output white light.

As another example, assuming all of the LED lights 102 in the front yard and back yard of a premises are in zones 1 and 2, respectively, and are currently outputting white light, the user can use the app to cause the transformer assembly 101 to dim the LED lights 102 in zone 1 while maintaining the current brightness of the LED lights 102 in zone 2. As another example, assuming all of the LED lights 102 in the front yard and back yard of a premises are in zones 1 and 2, respectively, and are currently outputting white light, the user can use the app to cause the transformer assembly 101 to change the color emitted by the LED lights 102 in zone 1 from white to red and to change the color of the light emitted by the LED lights 102 in zone 2 from white to green. As yet another example, the user can use the app to cause the transformer assembly 101 to sequence the colors displayed by the LED lights 102 in zone 1, e.g., the LED lights 102 in zone 1 emit white light for five seconds, then emit blue light for five seconds, and then repeat.

It should be noted that the inventive principles and concepts are not limited with regard to the types of commands that the transformer assembly 101 can cause the LED lights 102 to perform. Color changing, color sequencing, dimming, and zoning are examples of the types of commands that the LED lights 102 can be commanded to perform, but the inventive principles and concepts are not limited to these types of commands, as will be understood by those of skill in the art in view of the description provided herein.

Figure 2:
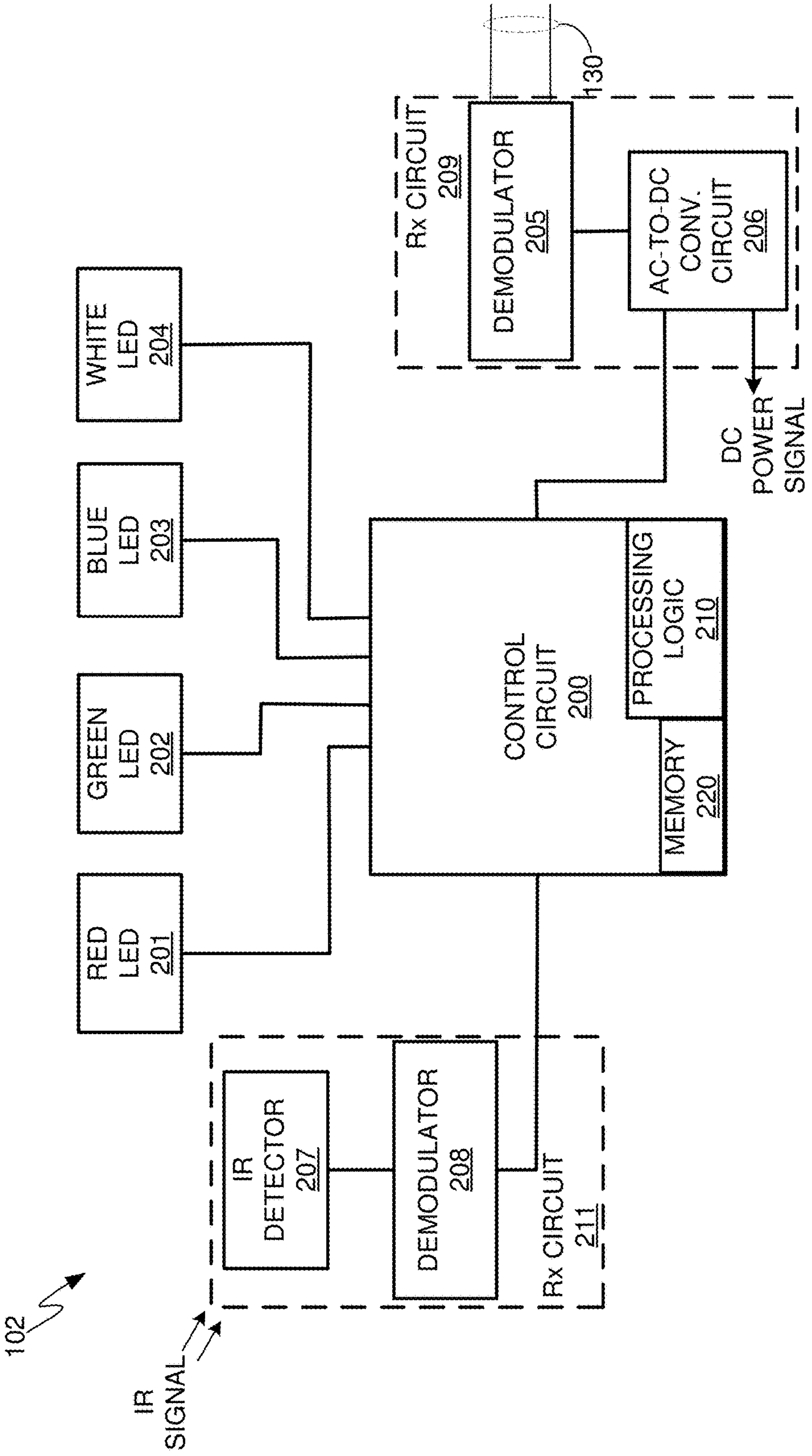
FIG. 2 is a block diagram of one of the LED lights shown in FIG. 1 in accordance with an exemplary embodiment.

FIG. 2 is a block diagram of the electrical circuitry of one the LED lights 102 shown in FIG. 1 in accordance with a representative embodiment. Preferably each LED light 102 comprises multiple LEDs for emitting light of multiple colors. In accordance with an exemplary embodiment, each LED light 102 includes a red LED 201, a green LED 202, a blue LED 203 and a white LED 204, but can instead include some subset of these color LEDs. The operations of the LED light 102 are controlled by an LED driver circuit comprising a control circuit 200 that controls the LEDs 201-204 based on commands received from the transformer assembly 101. As indicated above, in accordance with a representative embodiment, the transformer assembly 101 transmits data and electrical power to the LED lights 102 via a 12-volt AC signal carried on the two-wire interface 130. As will be described below in more detail, the transformer assembly 101 includes circuitry that modulates an AC carrier signal with a data signal that comprises commands to be performed by the LED lights 102. The data signal also includes the addresses of the LED lights 102 that are to perform the commands.

A demodulator circuit 205 of a receiver (Rx) circuit 209 of the LED driver circuit demodulates the AC signal and extracts the data signal from the AC power signal. An AC-to-DC conversion circuit 206 of the LED light 102 converts the AC power signal and the data signal into a DC power signal and a DC data signal, respectively. The DC power signal is used to power the various circuits of the LED light 102, including the control circuit 200 and the LEDs 201-204. The DC data signal is provided to the control circuit 200. Either the AC-to-DC conversion circuit 206 or the control circuit 200 comprises analog-to-digital conversion circuitry (ADC) that converts the DC data signal into a digital data signal suitable for processing by processing logic 210 of the control circuit 200. The processing logic 210 of the control circuit 200 interprets the commands contained in the digital data signal and controls the LEDs 201-204 in accordance with the commands. As indicated above, the commands include the address of the LED device 102 that was set using the non-contact, hand-held, address-setting remote control device 110, and therefore the control circuit 200 only performs commands that include the address that has been assigned to the LED device 102 by a user who uses the address-setting remote control device 110 to assign the address to the LED device 102.

As will be described below in more detail with reference to FIGS. 4A and 4B, when a user makes a selection on a control panel of the address-setting remote control device 110 to assign a particular address to one of the LED lights 102, an IR LED (not shown) of the address-setting remote control device 110 emits an encoded IR signal, i.e., an IR signal encoded with an address. The address-setting remote control device 110 is described below in detail with reference to FIGS. 4A and 4B. The encoded IR signal comprises an IR carrier wave that has been modulated with a data signal that contains the address to be assigned to the LED device 102. With reference again to FIG. 2, an IR photodetector 207 of another Rx circuit 211 of the LED light 102 detects the encoded IR signal and outputs an analog electrical signal to a demodulator circuit 208 of the Rx circuit 211. The demodulator circuit 208 demodulates the analog electrical signal to recover the data signal that contains the address information and outputs the data signal to the control circuit 200.

Inside of the control circuit 200 of the LED driver circuit of the LED light 102, the data signal is converted into a digital data signal by ADC circuitry (not shown) of the control circuit 200. The processing logic 210 inside of the control circuit 200 is configured to process the digital data signal to interpret the address. The control circuit 200 comprises a memory device 220, which can be, for example, a register or buffer, that is used to store the address. Subsequently, when commands are received by the LED light 102 from the transformer assembly 101, the processing logic 210 of the control circuit 200 determines whether the commands include the assigned address stored in the memory device 220, and if so, controls the LEDs 201-204 in accordance with the commands.

It should be noted that the LED light 102 shown in FIG. 2 can have additional circuits and/or circuits other than those that are shown in FIG. 2. The circuits that are shown in FIG. 2 and described above are only those circuits that are needed to describe inventive principles and concepts of the present disclosure.

Figure 3:
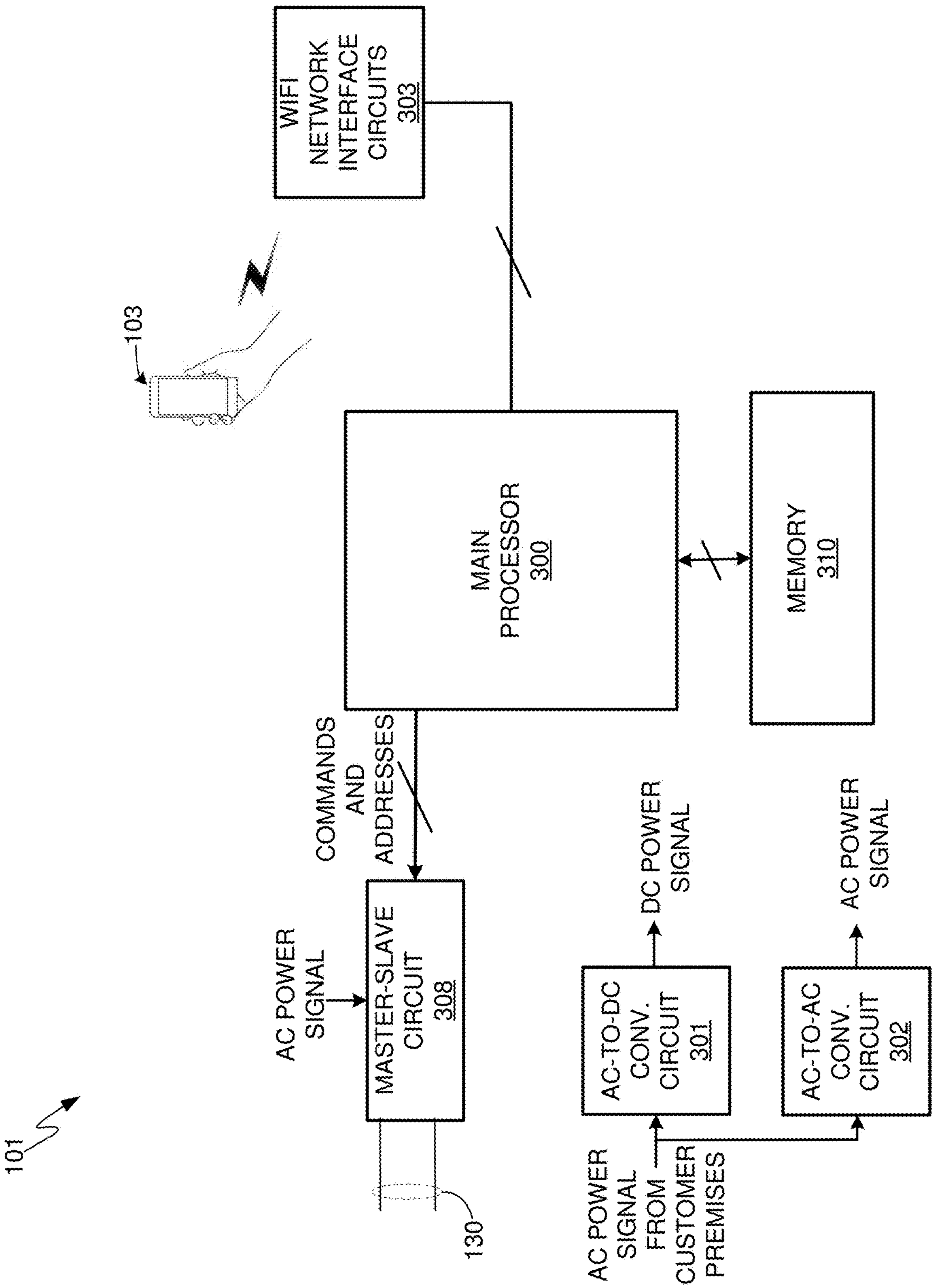
FIG. 3 shows a block diagram of the transformer assembly of the system shown in FIG. 1 in accordance with an exemplary embodiment.

FIG. 3 shows a block diagram if the transformer assembly 101 of the system 100 shown in FIG. 2 in accordance with an exemplary embodiment. An AC-to-DC conversion circuit 301 of the transformer assembly 101 converts an AC power signal received from the power supply 105 (FIG. 1) of the customer premises into one or more DC power signals at one or more respective power levels. The DC power signal(s) is used to provide DC power to the circuits of the transformer assembly 101 that require DC power, such as a main processor 300, a memory device 310 and WiFi network interface circuitry 303. An AC-to-AC conversion circuit 303 converts the AC power signal received from the power supply of the customer premises into an AC power signal having a level that is suitable for powering the LED lights 102, which preferably is a 12-volt AC signal.

The WiFi network interface circuitry 303 comprises Rx circuitry for receiving, demodulating and decoding WiFi signals received over the WiFi network from the router 104 (FIG. 1) of the customer premises and/or from the mobile device 103 running the app of the present disclosure. The WiFi network interface circuitry 303 also digitizes the decoded signals into digital data signals and outputs them to the main processor 300 of the transformer assembly 101. The WiFi network interface circuitry 303 typically also comprises transmitter (Tx) circuitry for modulating, encoding and transmitting WiFi signals over the WiFi network to the router 104 of the customer premises and to the mobile device 103 running the app of the present disclosure.

The main processor 300, which can be, for example, a microprocessor, a microcontroller, one or more state machines, a digital signal processor (DSP), etc., is configured to control the transformer assembly 101 based on computer instructions stored in memory device 310 and based on commands received from the app running on mobile device 103. When the main processor 300 receives commands from the app that have been demodulated, decoded and digitized by the WiFi network interface circuitry 303, the main processor 300 processes these commands based on its pre-configuration and/or based on instructions stored in the memory device 310. The commands received from the app include either the addresses of the LED lights 102 that are to perform certain actions or the zones in which the LED lights 102 to perform those actions are located. The main processor 300 then generates a corresponding data signal comprising commands and addresses that are to be sent over the two-wire interface 130 to the LED lights 102.

A master-slave circuit 308 of the transformer assembly 101 controls all communication over the two-wire interface 130 between the transformer assembly 101 and the LED lights 102. The master-slave circuit 308 includes modulation circuitry that modulates the AC power signal that is output from AC-to-AC conversion circuit 302 with the data signal that is output from the main processor 300. The resulting combined AC power and data signal is then transmitted by the master-slave circuit 308 over the two-wire interface 130 to the LED lights 102.

It should be noted that the transformer assembly 101 can have additional circuits and/or circuits other than those that are shown in FIG. 3. The circuits that are shown in FIG. 3 and described above are only those that are needed to describe some of the inventive principles and concepts of the present disclosure. For example, the transformer assembly 101 can also include a network interface circuit for interfacing the assembly 101 with a wired connection of a wired communication network of the customer premises.

It should also be noted that while the two-wire interface 130 is preferred for sending power and commands to the LED lights 102, other interfaces can be used for this purpose. For example, separate electrical cables or conductors can be used for power and data. Also, the LED lights 102 can have their own power sources or receive power directly from the customer premises wiring. In the latter case, the LED lights 102 can include conversion circuitry such as that represented by blocks 301 and 302 of FIG. 3 for performing any needed conversions.

Figure 4A:
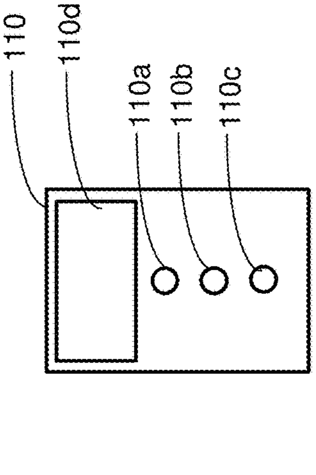
FIG. 4A is a front view of the hand-held, non-contact, address-setting remote control device shown in FIG. 1 in accordance with an exemplary embodiment.
Figure 4B:
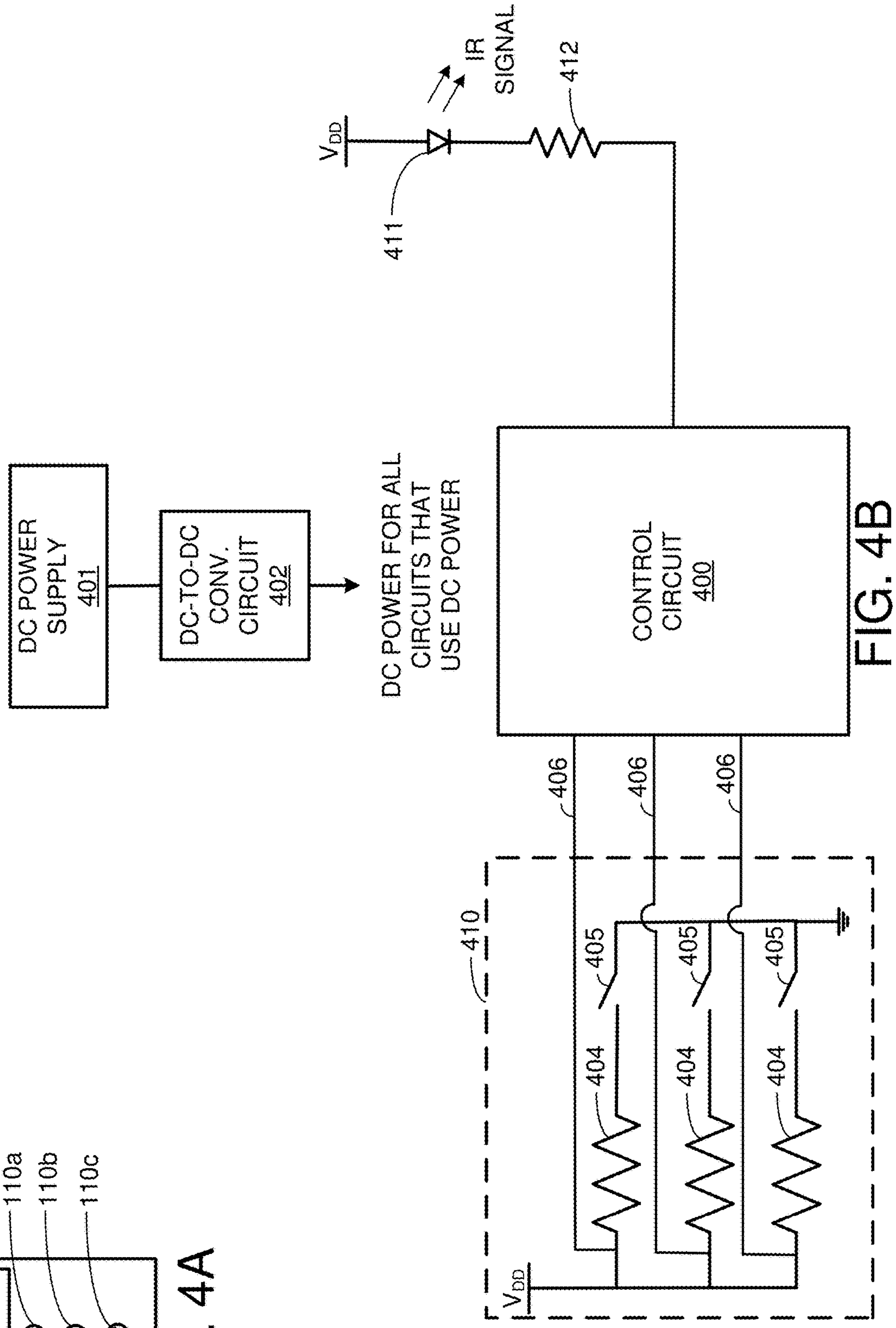
FIG. 4B shows a block diagram of the electrical system of the hand-held, non-contact, address-setting remote control device of the system shown in FIG. 4A in accordance with an exemplary embodiment.

FIG. 4A is a front view of the non-contact, hand-held, address-setting remote control device 110 of the system 100 shown in FIG. 1. FIG. 4B is a block diagram of the electrical circuitry of the address-setting remote control device 110 of the system 100 shown in FIG. 1 in accordance with an exemplary embodiment. The operations and configuration of the remote control device 110 in accordance with an exemplary embodiment will be described with reference to FIGS. 4A and 4B.

A DC-to-DC conversion circuit 402 converts a DC power signal received from a DC power supply 401 of the remote control device 110 into a DC power signal having a voltage level that is suitable for powering other circuits of the remote control device 110, such as control circuit 400 and an address-selection circuit 410. For ease of discussion, it will be assumed that the remote control device 110 can be controlled by a user by pressing three different actuation buttons 110*a*-110*c* on a control panel of the device 110 or by tapping three different radio buttons or icons in a display device 110*d* of the remote control device 110. This allows the user to choose different sets of commands that are to be performed by LED lights 102 that have been assigned different addresses using the remote control device 110.

In accordance with this example, the address-selection circuit 410 comprises three resistors 404 and three switches 405, with the switches 405 being in series with the respective resistors 405. Turning on any one of the switches 405 causes current to flow through the respective resistor 404 such that the corresponding voltage signal on line 406 is high, or a logic 1. Pressing or activating one of the buttons 110*a*-110*c* of the remote control device 110 causes the corresponding switch 405 to turn on, or close.

In accordance with this exemplary embodiment, the buttons 110*b* and 110*c* are used to select the address to be assigned to an LED light 102 being programmed and the button 110*a* is used to transmit the selected address to the LED light 102. For example, pressing the button 110*b* can cause a "1" address to be displayed on the display device 110*d* and then pressing the button 110*a* will cause the address "1" to be assigned to the LED light 102 as its address.

In accordance with an exemplary embodiment, pressing the button 110*b* multiple times increments the address number displayed on the display device 110*d* by one, e.g., pressing the button 110*b* twice consecutively when a "1" address is displayed will cause a "3" address to be displayed on the display device 110*d*. When the button 110*a* is pressed while an address is displayed on the display device 110*d*, the address that is displayed will be sent to the LED light 102 being programmed.

The same is true for button 110*c*, except that button 110*c* is used to decrement the address being displayed on the display device 110*d*, e.g., if a "9" address is displayed on the display device 110*d*, pressing the button 110*c* twice consecutively will cause a "7" address to be displayed on the display device 110*d*. Pressing the button 110*a* will then cause the "7" address to be sent to the LED light 102 being programmed.

The control circuit 400 comprises logic configured to interpret the states of the low or high voltage signals on lines 406 as the address to be assigned to the LED light 102. The control circuit 400 includes circuitry for generating an electrical signal that is applied to an IR LED 411, which is coupled by a resistor 412 to an output terminal of the control circuit 400. This electrical signal output from the control circuit 400 causes the IR LED 411 to generate an IR signal that is encoded with the selected address. As described above, circuitry of the Rx circuit 211 of the LED light 102 shown in FIG. 2 detects and decodes the IR signal to recover the address, which is then stored in the memory device 220 shown in FIG. 2 as the assigned address of the LED light 102.

One of the advantages of using the remote control device 110 of the present disclosure is that it can remotely set the addresses of the LED lights 102 after the LED lights 102 have been installed. In other words, it is not necessary to assign the addresses of the LED lights 102 before installation. In some known LED lighting systems, the addresses of the LED lights are set prior to installation, which is inconvenient for debugging, installation and management. Using the remote control device 110 is more convenient for assigning the addresses after installation without having to be in contact with, or in close proximity to, the LED lights 102, and it can be used to change the addresses after installation, which makes on-site installation and debugging much easier. The control circuits 200 and 400 shown in FIGS. 2 and 4, respectively, can have a variety of configurations, but typically comprise both analog circuitry and digital circuitry. Both of the circuits 200 and 400 preferably use digital circuitry to perform the algorithms or processes described above with reference to FIGS. 2 and 4, respectively, but analog circuitry could instead be used for this purpose.

The main processor 300 of the transformer assembly 101 shown in FIG. 3 preferably is a microprocessor or microcontroller that executes software and/or firmware stored in the memory device 310 shown in FIG. 3 to perform the tasks described above with reference to FIG. 3. The memory device 310 can be any suitable type of non-transitory computer readable medium, such as random access memory (RAM), read only memory (ROM), flash memory, etc.

Figure 5:
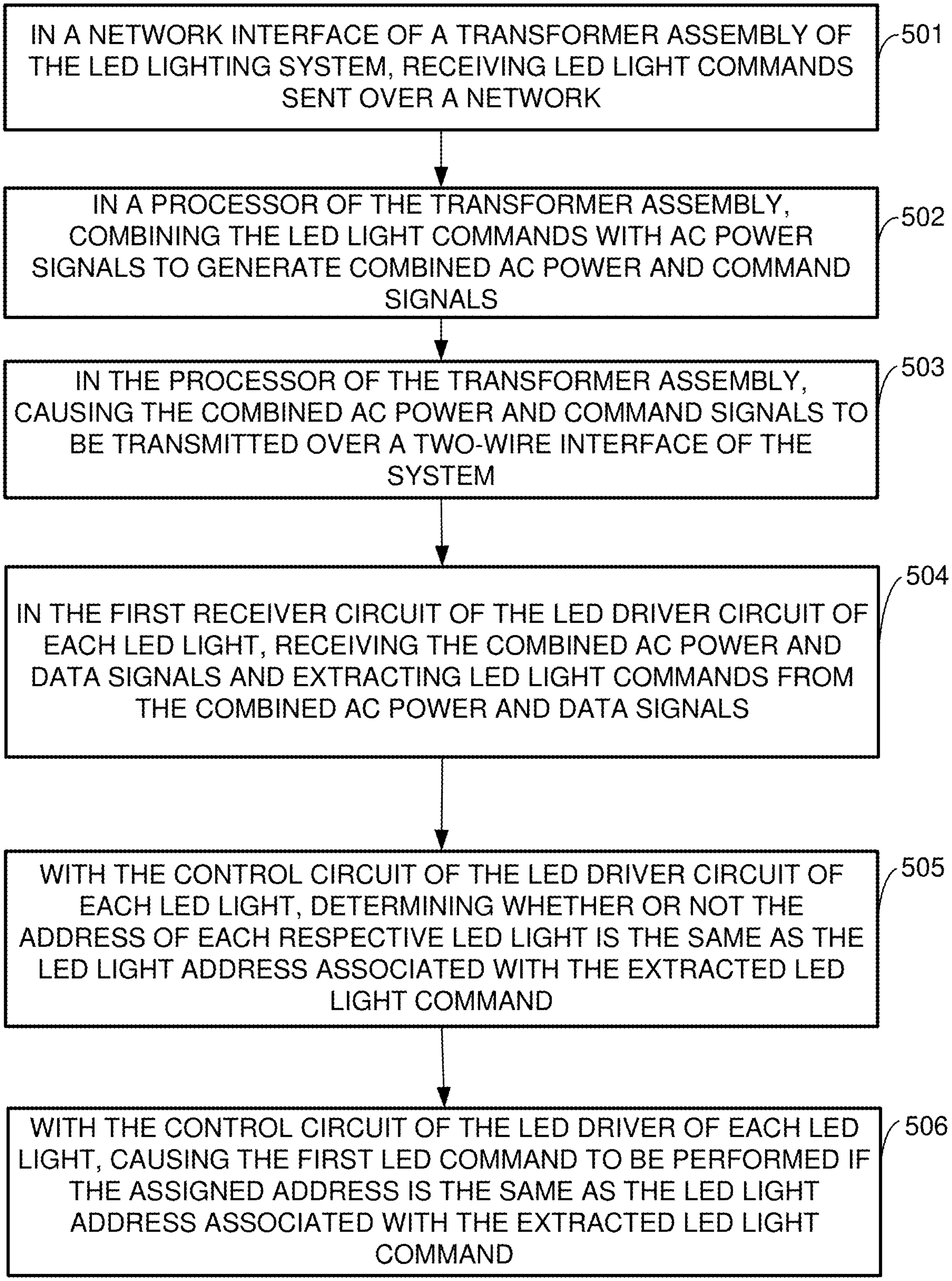
FIG. 5 is a flow diagram of the method performed by the LED lighting system shown in FIG. 1 in accordance with an exemplary embodiment.

FIG. 5 is a flow diagram of the method performed by the system 100 shown in FIG. 1 and described above with reference to FIGS. 1-4B. Block 501 of FIG. 5 represents, in a network interface circuit of a transformer assembly, receiving LED light commands sent over a network, where each LED light command includes an LED light address or information associating the LED light command with an LED light address. Block 502 represents, in a processor of the transformer assembly, combining the LED light commands with AC power signals to generate combined AC power and command signals. Block 503 represents the processor of the transformer assembly causing the combined AC power and command signals to be transmitted over a two-wire interface of the LED lighting system.

Block 504 represents, in first receiver circuits of respective LED lights of a plurality of LED lights of the LED lighting system that are electrically coupled to the two-wire interface, receiving the combined AC power and command signals transmitted over the two-wire interface and extracting the LED light commands from the combined AC power and command signals, where each of the LED lights has an assigned address. Block 505 represents, in control circuits of the respective LED lights, determining whether or not the assigned address of each respective LED light is the same as the LED light address associated with the extracted LED light commands. If so, the control circuits cause the respective LED lights to perform the extracted LED light commands, as indicated by block 506.

Figure 6:
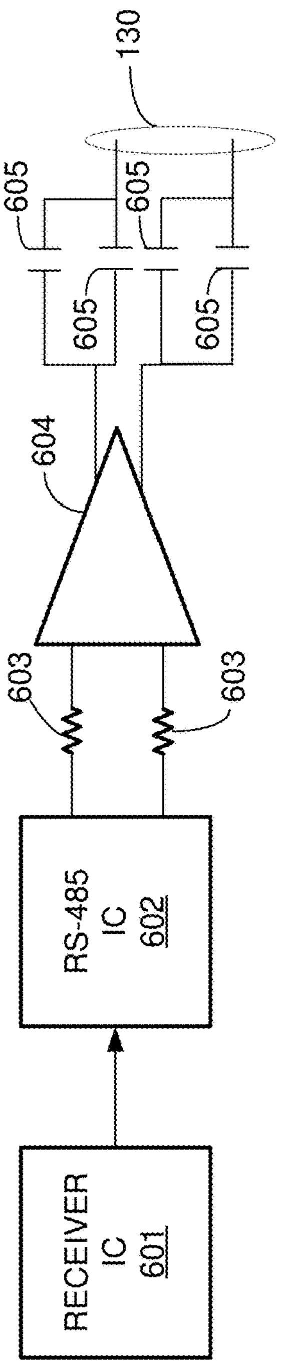
FIG. 6 is a block diagram of portions of the WiFi network interface and master-slave circuits of the transformer assembly shown in FIG. 3 in accordance with a representative embodiment for encoding an AC power signal with command and address data for transmission by the transformer assembly shown in FIG. 1 over the two-wire interface shown in FIG. 1.

FIG. 6 is a block diagram of portions of the WiFi network interface and master-slave circuits 303 and 308, respectively, of the transformer assembly 101 shown in FIG. 3 in accordance with a representative embodiment. In accordance with this representative embodiment, a receiver integrated circuit (IC) chip 601 receives the aforementioned data signal comprising LED light command and address information sent from the mobile phone running the app 103. The receiver IC chip 601 is a dedicated IC chip that converts the data signal into a pulse signal where the distance in time between the pulses represents logic 0 and logic 1 bits.

Figure 7:
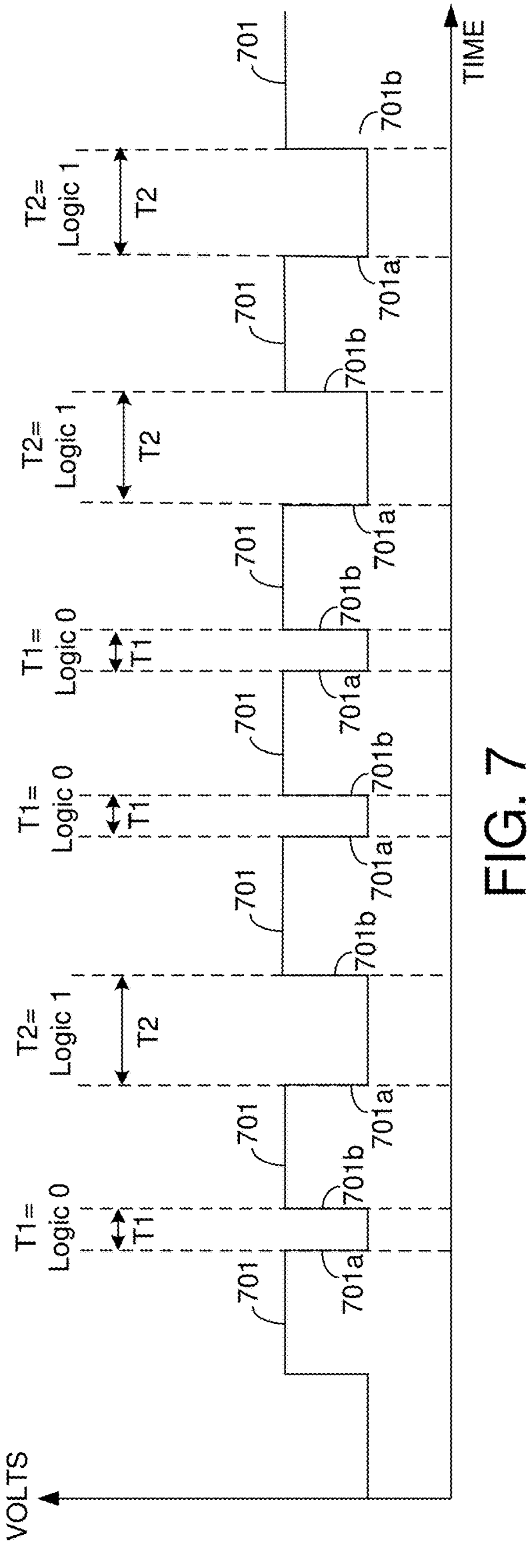
FIG. 7 is a timing diagram of a pulse signal produced by the receiver IC shown in FIG. 6 in which bits comprising command and address data are represented by differences in the length of time between the falling edge of each pulse and the rising edge of the next pulse.

FIG. 7 is a timing diagram of the pulse signal comprising the data. The pulses 701 have a fixed duration in time, but the length of time between the falling edge 701*a* of each pulse 701 and the rising edge 701*b* of the next pulse 701 varies between a first length of time, T1, and a second length of time, T2. The length of time T2 is greater than the length of time T1. In accordance with a representative embodiment, the length of time T1 represents a logic 0, i.e., a bit having a logic 0 value, and the length of time T2 represents a logic 1, i.e., a bit having a logic 1 value. It should be noted that the length of times T1 and T2 could instead represent a logic 1 and a logic 0, respectively.

With reference again to FIG. 6, the pulse signal output from receiver IC chip 601 is input to a differential signal generating IC chip 602, which can be, for example, an RS-485 IC chip, for example. The RS-485 IC chip 602, also known as a TIA-485 or EIA-485 IC chip, is a standard IC chip used for generating differential signals for transmission over a two-wire interface that uses a linear bus topology. For exemplary purposes, it will be assumed hereinafter that chip 602 is an RS-485 IC chip. The RS-485 IC chip 602 converts the pulse signal output from chip 601 into a high-frequency differential pulse signal, which is then coupled by resistors 603 onto first and second input terminals of a power amplifier 604. The power amplifier 604 amplifies the differential pulse signal to produce an amplified differential pulse signal, which is then capacitively coupled by capacitors 605 onto the two-wire interface 130 (FIG. 1).

The amplified differential pulse signal that is coupled onto the two-wire interface 130 is a combination of the low-frequency 12-volt AC power signal and the high-frequency pulse signal that contains the LED command and address information. The isolation coupling circuit comprising capacitors 605 isolates the low-frequency 12-volt AC power signal from the high-frequency pulse signal to allow them both to be carried over the two-wire interface 130 to the LED lights 102 and subsequently separated out from one another by circuitry of the LED lights 102, as will be described below with reference to FIG. 8.

Figure 8:
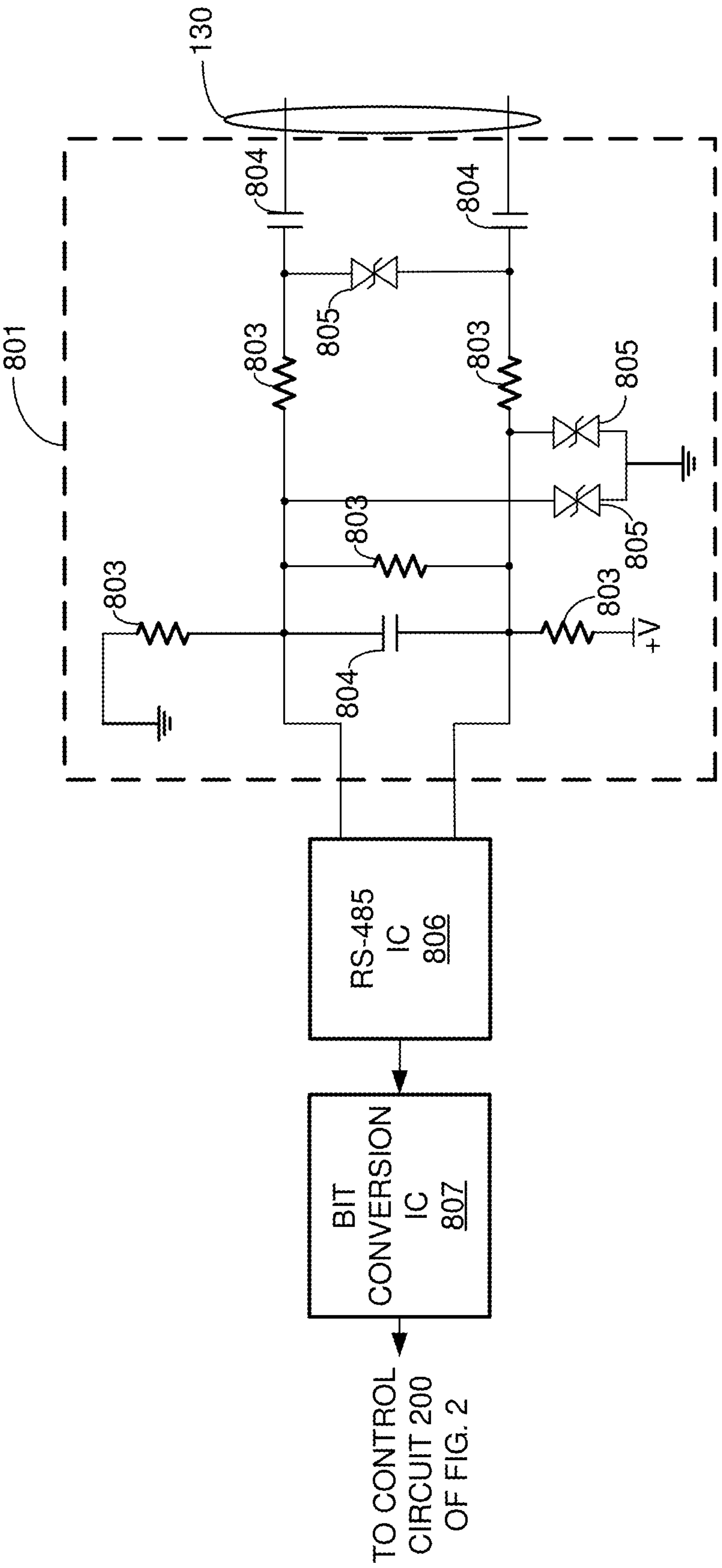
FIG. 8 is a block diagram of portions of the Rx circuit 209 shown in FIG. 2 in accordance with a representative embodiment for receiving and decoding a differential pulse signal sent by the transformer assembly shown in FIG. 1 over the two-wire interface shown in FIG. 1.

FIG. 8 is a block diagram of portions of the Rx circuit 209 of the LED lights 102 shown in FIG. 2 in accordance with a representative embodiment for receiving and decoding the amplified differential pulse signal transmitted by the amplifier circuit 604/605 shown in FIG. 6 over the two-wire interface 130. In accordance with this representative embodiment, a depolarization and coupling isolation circuit 801 receives the amplified differential pulse signal that was transmitted over the two-wire interface 130 by the transformer assembly 101. The circuit 801 comprises a plurality of resistors 803, capacitors 804 and cathode-to-cathode-connected Zener diodes 805 that performs noise filtering and circuit protection. The circuit 801 isolates the low-frequency AC signal from the high-frequency electrical pulse signal and converts it into a differential signal suitable for processing by IC chip 806.

IC chip 806, which can be an RS-485 IC chip, for example, comprises a differential-to-single-ended conversion circuit that converts the differential signal received from circuit 801 into a single-ended signal comprising the high-frequency pulse signal that contains the LED light command and address information. This signal is then received by a dedicated IC chip 807, which is a bit conversion IC chip that converts the high-frequency pulse signal into a transistor-transistor logic (TTL) bit level signal suitable for processing by the control circuit 200 shown in FIG. 2. The dedicated IC chip 807 comprises circuitry that is configured to perform the process described above with reference to FIG. 7 of determining whether the length of time between adjacent pulses is equal to T1 or T2 and outputting a logic 0 bit or a logic 1 bit, respectively.

It should be noted that the inventive principles and concepts are not limited to the particular circuits shown in FIGS. 6 and 8. The circuits shown in FIGS. 6 and 8 are examples of suitable circuits for performing the processes described above, but persons of skill in the art will understand, in view of the description provided herein, that many other circuit configurations can be used to combine data onto an AC power signal in the transformer assembly and to extract the data from the AC power signal in the driver circuits of the LED lights. It should also be noted that the IC chips can be replaced by non-integrated circuits.

Although selected aspects have been illustrated and described in detail, it will be understood that various substitutions and alterations may be made therein without departing from the spirit and scope of the present invention, as defined by the following claims.

What is claimed is:

1. A light emitting diode (LED) lighting system comprising:

a transformer assembly comprising a network interface circuit and a processor, the network interface circuit being configured to receive LED light commands sent over a network, each LED light command being associated with an LED light address, the processor being configured to cause the LED light commands to be combined with alternating current (AC) power signals to generate combined AC power and command signals, the processor being configured to cause the combined AC power and command signals to be transmitted over a two-wire interface of the LED lighting system; and a plurality of LED lights electrically coupled to the two-wire interface, each LED light having an assigned address and comprising one or more LEDs and an LED driver circuit, each LED driver circuit comprising a first receiver circuit and a control circuit, the first receiver circuit being electrically coupled to the two-wire interface and being configured to receive the combined AC power and command signals transmitted over the two-wire interface and to extract the LED light commands from the combined AC power and command signals, the control circuit being configured to determine whether or not the assigned address of each respective LED light is the same as the LED light address associated with the extracted LED light command, and if so, to perform the extracted LED light command; and wherein the transformer assembly further comprises:

a first receiver circuit configured to receive the LED light commands sent over a network, the first receiver circuit being configured to convert the LED light commands into a pulse signal comprising a series of pulses, each pulse being separated in time from an adjacent pulse by a first length of time, T1, or a second length of time, T2, wherein separations by the first and second lengths of time T1 and T2, respectively, represent bits having logic 0 and logic 1 values, respectively;

a first differential signal generating circuit configured to receive the pulse signal from the receiver circuit and convert the pulse signal into a first high-frequency differential pulse signal:

an amplifier circuit configured to receive the first high-frequency differential pulse signal from the differential signal generating circuit and to combine the first high-frequency differential pulse signal with a low-frequency alternating current (AC) power signal to produce an amplified differential pulse signal comprising the combined first high-frequency differential pulse signal and the low-frequency AC power signal; and a first coupling circuit configured to receive the amplified differential pulse signal and couple the amplified differential transmission signal onto a two-wire interface, and wherein the first coupling circuit is a capacitive coupling circuit, the capacitive coupling circuit isolating the first high-frequency differential pulse signal from the low-frequency AC power signal before coupling the amplified differential signal onto the two-wire interface.

2. The LED lighting system of claim 1, further comprising a hand-held, non-contact, address-setting remote control device configured to be remotely controlled by a user to allow the user to remotely assign the assigned addresses to the LED lights after the LED lights have been installed without coming into contact with the LED lights.

3. The LED lighting system of claim 2, wherein the hand-held, non-contact, address-setting remote control device comprises an address-selection circuit and a control circuit, the address-selection circuit being configured to generate addresses to be assigned to the LED lights based on one or more selections made by a user of the address-setting remote control device.

4. The LED lighting system of claim 3, wherein the control circuit of the remote control device is configured to cause an address-assignment signal that includes the generated address to be transmitted over an over-the-air (OTA) interface to one or more of the LED lights to cause the generated address to be assigned to said one or more LED lights as the assigned addresses.

5. The LED lighting system of claim 4, wherein the control circuit further comprises:

a second receiver circuit that is configured to detect the transmitted address-assignment signal and to process the address-assignment signal to extract the respective assigned address; and logic configured to store the extracted assigned address in a memory device as the assigned address for the respective LED light; and logic configured to compare the stored assigned address to the LED light address contained in the extracted LED light command to determine whether the extracted LED light command is to be performed.

6. The LED lighting system of claim 5, wherein the address-assignment signal is an infrared (IR) signal generated by an IR LED of the remote control device.

7. The LED lighting system of claim 5, wherein the address-assignment signal is a radio frequency (RF) signal generated by an RF signal generator of the remote control device.

8. The LED lighting system of claim 1, wherein each LED light comprises a plurality of LEDs that emit at least one of:

light of a single color;

light of at least two different colors;

light of at least three different colors; and white light.

9. The LED lighting system of claim 1, wherein the network interface circuit is a wireless network interface circuit and the network is a wireless network, and wherein the wireless network interface circuit is configured to receive LED light commands sent over the wireless network from a mobile device running an application program (app).

10. The LED light system of claim 1, wherein the LED light commands comprise at least one of:

commands for causing one or more of the LED lights to change color;

commands for causing one or more of the LED lights to perform color sequencing;

commands for causing one or more of the LED lights to become dimmer in optical intensity; and commands for causing one or more of the LED lights that are located in different zones to output light of different colors.

11. A method for controlling the light emitting diode (LED) lighting system of claim 1, the method comprising:

in the network interface circuit of a transformer assembly, receiving the LED light commands sent over the network;

in the processor of the transformer assembly, combining the LED light commands with alternating current (AC) power signals to generate combined AC power and command signals and causing the combined AC power and command signals to be transmitted over the two-wire interface of the LED lighting system;

in second receiver circuits of respective LED lights of a plurality of LED lights of the LED lighting system that are electrically coupled to the two-wire interface, receiving the combined AC power and command signals transmitted over the two-wire interface and extracting the LED light commands from the combined AC power and command signals; and in control circuits of the respective LED lights, determining whether or not the LED light address of each respective LED light is the same as the LED light address associated with the extracted LED light commands, and if so, causing the respective LED light to perform the extracted LED light command.

12. The method of claim 11, further comprising:

with a hand-held, non-contact, address-setting remote control device, remotely assigning the LED light addresses to the LED lights after the LED lights have been installed without coming into contact with the LED lights.

13. The method of claim 12, wherein the hand-held, non-contact, address-setting remote control device comprises an address-selection circuit and a control circuit, the method further comprising:

with the address-selection circuit, generating addresses to be assigned to the LED lights based on one or more selections made by a user of the address-setting remote control device.

14. The method of claim 13, further comprising:

with the control circuit of the remote control device, causing an address-assignment signal that includes the generated address to be transmitted over an over-the-air (OTA) interface to one or more of the LED lights to cause the generated address to be assigned to said one or more LED lights as the assigned addresses.

15. The method of claim 14, further comprising:

with the second receiver circuits of said one or more LED lights, detecting the transmitted address-assignment signal and processing the address-assignment signal to extract the respective assigned address; and with the control circuits of said one or more LED lights, storing the extracted assigned address in respective memory devices of the respective control circuits as the assigned addresses for the respective LED lights, and wherein the step of determining whether or not the assigned address of each respective LED light is the same as the LED light address contained in the extracted LED light commands comprises comparing the stored assigned addresses to the LED light address contained in the extracted LED light commands.

16. The method of claim 14, wherein the address-assignment signal is one of an infrared (IR) signal generated by an IR LED of the remote control device and a radio frequency (RF) signal generated by an RF signal generator of the remote control device.

17. The method of claim 11, wherein each LED light comprises a plurality of LEDs that emit at least one of: light of a single color;

light of at least two different colors;

light of at least three different colors; and white light.

18. The LED lighting system of claim 1, wherein each LED light has an LED driver circuit, each LED driver circuit comprising:

a second coupling circuit configured to receive the amplified differential pulse signal and to perform isolation coupling and depolarization to produce a differential pulse signal;

a differential-to-single-ended conversion circuit configured to convert the differential pulse signal produced by the second coupling circuit into a single-ended signal; and a bit conversion circuit configured to receive the single-ended signal and to convert the single-ended into bits for processing by a digital control circuit of the LED driver circuit.

* * * * *